(12) United States Patent
Cricri et al.

(10) Patent No.: US 11,657,264 B2
(45) Date of Patent: May 23, 2023

(54) CONTENT-SPECIFIC NEURAL NETWORK DISTRIBUTION

(71) Applicant: Nokia Technologies Oy, Espoo (FI)

(72) Inventors: Francesco Cricri, Tampere (FI); Caglar Aytekin, Tampere (FI); Emre Baris Aksu, Tampere (FI); Miika Sakari Tupala, Tampere (FI); Xingyang Ni, Tampere (FI)

(73) Assignee: Nokia Technologies Oy, Espoo (FI)

( * ) Notice: Subject to any disclaimer, the term of this patent is extended or adjusted under 35 U.S.C. 154(b) by 1445 days.

(21) Appl. No.: 15/948,304

(22) Filed: Apr. 9, 2018

(65) Prior Publication Data

US 2019/0311259 A1    Oct. 10, 2019

(51) Int. Cl.
  *G06N 3/08*    (2023.01)
  *G06F 7/58*    (2006.01)
  *H04L 65/70*    (2022.01)

(52) U.S. Cl.
  CPC .............. *G06N 3/08* (2013.01); *G06F 7/588* (2013.01); *H04L 65/70* (2022.05)

(58) Field of Classification Search
  CPC combination set(s) only.
  See application file for complete search history.

(56) References Cited

U.S. PATENT DOCUMENTS

2004/0010480 A1    1/2004    Agnihotri et al.
2006/0224532 A1*  10/2006    Duan ...................... G06N 3/08
                                                          706/15
2015/0161662 A1*   6/2015    Minor ................ G06Q 30/0275
                                                          705/14.48
2017/0147909 A1*   5/2017    Izumi ................... G06K 9/6269
2017/0347110 A1*  11/2017    Wang .................... G06T 3/4007

FOREIGN PATENT DOCUMENTS

WO    WO-2016/156864 A1    10/2016
WO       2018/150083 A1     8/2018

OTHER PUBLICATIONS

Pavelka (Algorithms for Initialization of Neural Netowrk Weights—2004) (Year: 2004).*
W_WANG—Video Salient Object Detection via Fully Convolutional Networks—2018 (Year: 2018).*

(Continued)

*Primary Examiner* — Ying Yu Chen
*Assistant Examiner* — Shamcy Alghazzy
(74) *Attorney, Agent, or Firm* — Harrington & Smith

(57) ABSTRACT

Media content is received for streaming to a user device. A neural network is trained based on a first portion of the media content. Weights of the neural network are updated to overfit the first portion of the media content to provide a first overfitted neural network. The neural network or the first overfitted neural network is trained based on a second portion of the media content. Weights of the neural network or the first overfitted neural network are updated to overfit the second portion of the media content to provide a second overfitted neural network. The first portion and the second portion of the media content are sent with associations to the first overfitted neural network and the second overfitted to the user equipment.

19 Claims, 4 Drawing Sheets

(56) References Cited

OTHER PUBLICATIONS

M. Geng et al.; "Deep Transfer Learning for Person Re-identification"; arXiv (online); Nov. 22, 2016; 12 pages (abstract, sections 4.1, 5.2, 5.4, Fig. 1).

C. Zhang et al.; "Understanding Deep Learning Requires Re-Thinking Generalization"; arXiv (online; Feb. 26, 2017; 15 pages (abstract, sections 1, 2.1).

L. Yu et al.; "Integrating Online and Offline Three-Dimensional Deep Learning for Automated Polyp Detection in Colonoscopy Videos"; IEEE Journal of Biomedical and Health Informatics, vol. 21, No. 1; Jan. 2017; pp. 65-75 (abstract, sections II, IV, Fig. 2).

"Use casesand requirements for coded representation of neural networks"; ISO/IECJTC1/SC29/WG11/N17338, Jan. 2018, Gwangju, Korea; Feb. 23, 2018; 22 pages (sections 1, 2.4, 2.7, 4.3).

\* cited by examiner

CONTENT-SPECIFIC NEURAL NETWORK DISTRIBUTION

TECHNICAL FIELD

This disclosure generally relates to streaming and to the processing of media content.

BACKGROUND

A neural network (NN) is a computation graph consisting of several layers of computation. Each layer consists of one or more units, where each unit performs an, elementary computation. A unit is connected to one or more other units, and the connection may have a weight associated with it. The weight may be used for scaling a signal passing through the associated connection. Weights are usually learnable parameters, meaning that the weights have values which can be learned from training data.

Two of the most widely used architectures for neural networks are feed-forward and recurrent architectures. Feed-forward neural networks have no feedback loops; that is to say, each layer takes input from one or more previous layers and provides output to one or more subsequent layers. Moreover, units within a certain layer take input from units in one or more preceding layers, and provide output to one or more following layers. Initial layers, which are those close to the input data, extract semantically low-level features, such as edges and textures in images, and intermediate and final layers extract more high-level features. After the feature-extraction layers, there may be one or more layers performing a certain task, such as classification, semantic segmentation, object detection, denoising, style transfer, and super-resolution.

In a recurrent neural network, there are one or more feedback loops, enabling the neural network to become stateful, meaning that it is able to memorize information or a state.

Neural networks are being utilized in an ever-increasing number of applications for many different types of devices, including mobile telephones. Examples of such applications include image and video analysis and processing, social media data analysis, and device usage data analysis.

SUMMARY

According to a first aspect of the present disclosure, an apparatus comprises at least one processor; and at least one memory including computer program code. The at least one memory and the computer program code are configured, with the at least one processor, to cause the apparatus to receive media content for streaming to a user device; to train a neural network to be overfitted to at least a first portion of the media content; and to send the trained neural network and the first portion of the media content to the user equipment.

According to a second aspect of the present disclosure, a method comprises receiving media content for streaming to a user device; training a neural network to be overfitted to at least a first portion of the media content; and sending the trained neural network and the first portion of the media content to the user equipment.

According to a third aspect of the present disclosure, a computer program product comprises a non-transitory computer-readable storage medium bearing computer program code embodied therein for use with a computer. The computer program code comprises code for receiving media content for streaming to a user device; for training a neural network to be overfitted to at least a first portion of the media content; and for sending the trained neural network and the first portion of the media content to the user equipment.

According to a fourth aspect of the present disclosure, an apparatus comprises at least one processor; and at least one memory including computer program code. The at least one memory and the computer program code are configured, with the at least one processor, to cause the apparatus to receive at least a first portion of media content and a neural network trained to be overfitted to the first portion of the media content; and to process the first portion of the media content using the overfitted neural network.

According to a fifth aspect of the present disclosure, a method comprises receiving at least a first portion of media content and a neural network trained to be overfitted to the first portion of the media content; and processing the first portion of the media content using the overfitted neural network.

According to a sixth aspect of the present disclosure, a computer program product comprises a non-transitory computer-readable storage medium bearing computer program code embodied therein for use with a computer. The computer program code comprises code for receiving at least a first portion of media content and a neural network trained to be overfitted to the first portion of the media content; and for processing the first portion of the media content using the overfitted neural network.

BRIEF DESCRIPTION OF THE DRAWINGS

The foregoing and other aspects of these teachings are made more evident in the following detailed description, when read in conjunction with the attached drawing figures.

DETAILED DESCRIPTION

Figure 1:
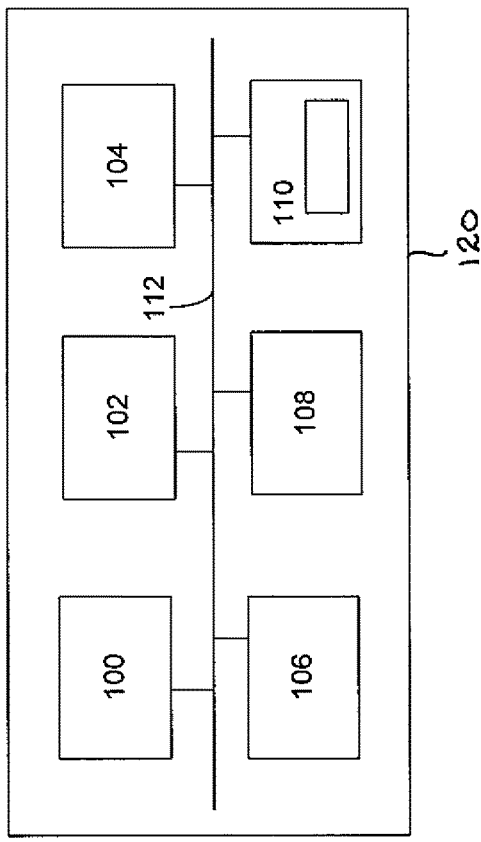
FIG. 1 shows a server suitable for use in the practice of the process described herein.

The most important property of neural networks, and of other machine-learning tools, is to be able to learn properties from input data, either in a supervised way or in an unsupervised way. Such learning is a result of a training algorithm, or of a meta-level neural network providing a training signal.

In general, the training algorithm involves changing some properties of the neural network so that the output of the neural network is as close as possible to a desired output. For example, in the case of the classification of objects in images, the output of the neural network can be used to derive a class or category index indicating the class or category to which an object in the input image belongs. Training usually is accomplished by minimizing the error in the output, such error being referred to as the loss. Examples of losses are mean-squared error and cross-entropy.

In recent deep-learning techniques, training is an iterative process, where, in each iteration, the training algorithm modifies the weights of the neural network to make a gradual improvement in the output of the neural network, or, in other words, to decrease the loss gradually.

Training a neural network is an optimization process, but the final goal of this optimization process is different from the typical goal of optimization. In optimization, the only goal generally is to minimize a functional. Here, in machine learning, the goal of an optimization or training process is to make the neural network learn the properties of a data distribution from a limited training dataset. In other words, the goal is to learn to use a limited training dataset in order to learn to generalize to previously unseen data, that is, to data which was not used for training the neural network. This is usually referred to as generalization.

In practice, data is usually split into at least two sets: a training set and a validation set. The training set is used for training the neural network, that is, to modify the weights of the neural network in order to minimize the loss. The validation set is used for checking the performance of the neural network on data which was not used to minimize the loss, in order to have an indication of the final performance of the neural network.

In particular, the errors on the training set and on the validation set are monitored during the training process to understand the following things:

Whether the neural network is learning at all—in this case, the training set error should decrease; otherwise, the neural network is in the regime of underfitting.

Whether the neural network is learning to generalize—in this case, the validation set error also needs to decrease and to be not too much higher than the training set error. If the training set error is low, but the validation set error is much higher than the training set error, or it does not decrease, or even increases, the neural network is in the regime of overfitting, which means that the neural network has just memorized the properties of the training set and performs well only on that set, but performs poorly on a set not used for tuning the weights of the neural network.

In general, overfitting is not a desirable property and is actually an issue to be avoided, because usually a neural network needs to perform well on new data.

One of the use cases recently considered regarding coded representations of neural networks was the distribution of neural networks for content processing. In this use case, the neural network may be sent to a destination device along with the video content on which the neural network is to be applied. In such use cases, one of the purposes of the neural network is to process the video to enhance it, for example, by denoising, super-resolution, inpaint, and/or removing encoding artifacts. However, other use cases where the output is not of the same type as the input may also be considered.

A neural network trained in the usual way on a large corpus of video data, in order to generalize well enough, may still not provide acceptable results for some applications. For example, a neural network trained to up-sample an image which was previously down-sampled may not be able to output an up-sampled version of the input data which is of the same quality as the original data before down-sampling.

Training neural networks may be done for inpainting regions of video content. In such cases, multiple neural networks may be used for different contexts of video content, such as sport, concert, indoor, or outdoor. The context may be signaled to a receiving device. The signaling may also indicate a time interval of the video content having a context for which a particular neural network is suitable.

More specifically, during the streaming of video content, a sender device, such as a server, signals contexts, which are used by a receiver to switch inpainting neural networks. The inpainting neural networks are already at the receiver, and are generic for any video content, and not fine-tuned or overfitted to specific video content. So, the signaled information is used to switch neural networks.

In an additional embodiment, the sender may directly send a weight update of the generic inpainting neural network to be used in a certain temporal portion of video content. In theory, such generic inpainting neural networks may be received at the receiver from a third-party entity, as generic inpainting neural networks are trained to work and generalize on any video content of a given context. However, the neural network has not been trained on the specific target video content.

According to the present disclosure, a neural network is overfit onto target content and sent to a destination device with the target content in order to obtain a better performing neural network for content processing. The present disclosure also includes signaling techniques for accomplishing this objective. The content in question may be a video.

According to various embodiments of the present disclosure, content-specific overfitting may be performed at different temporal or spatial granularity levels. For example, in one embodiment, the neural network may be signaled only once for the whole video content. In another embodiment, different neural networks may be used for different temporal portions of the video content; in this case, the neural networks need to be signaled in time for use in the correct temporal portion. In still another embodiment, a neural network may be signaled for each video frame. In another embodiment, a neural network may be signaled for each spatial portion of an image or frame.

The overfitting may result in modifying only a subset of the weights each time, meaning that less data will need to be sent. Even if all the weights may be modified for overfitting, the entropy of the modification to be transmitted may be much lower than the entropy of the actual value of the weights, thus resulting in lower bitrate if entropy coding is used. In addition, as will be pointed out below, cross-datastream adaptation may be used in order to use information contained in the content bitstream for assisting the inference process of the overfitted neural networks.

Additional details and additional or alternative embodiments will be described in detail below.

The use of at least two devices or entities will be assumed. One device, which will be referred to as a server, streams a video to the other device, which will be referred to as a device or as a user device.

It is also assumed that the server has the necessary computational, memory, and power capabilities for training neural networks. The user device is assumed to have the necessary computational, memory, and power capabilities for performing inference of a neural network. Usually, the capabilities required for training neural networks are higher than those for inference.

It is further assumed that the video content is to be processed by at least one neural network at the user device, for such purposes as to denoising, up-sampling, or removing compression artifacts. These tasks of the neural network may be simply referred to as "enhancing" operations, although the present disclosure is by no means limited to such use cases. Also, other types of tasks may be considered, such as classification.

In order to maximize the effectiveness of the neural-network-based video processing at the user device, the present disclosure includes overfitting the neural network on the target content on which the neural network will be applied. This is in contrast with common training and usage approaches of neural networks, in which the goal is to obtain a neural network which has not memorized the training data. However, since, according to the present disclosure, the server performing the training knows the test content in advance, it is proposed to leverage this aspect and to perform the training directly on the test content.

The neural network to be overfit may have been initialized either by using a random weight vector, or by pre-training the neural network on a large dataset, or the network may even be non-initialized. When further trained on the target content, the server will move the neural network from a generalization state to an overfitted state. Furthermore, the user device may already possess the initial version of the neural network, before the overfitting occurs.

In one example, the server may take a general neural network, that is, a neural network not overfitted on a specific video content, and a first portion of video content, such as a temporal portion, that is a portion at a specific time interval. The portion of the video content may be used to train the general neural network further, causing the neural network to be overfitted for the first portion of the video content. The overfitted neural network may be stored, or transmitted, and associated with the first portion of the video content. After processing the first portion, the server may take a second portion of video content and use a similar approach to generate an overfitted neural network for the second portion of the video content.

In the simplest case, video content is a three-dimensional data type, of which two dimensions are spatial and a third dimension is temporal, thus overfitting can occur in any combination of these dimensions. Here, for the sake of simplicity, we will consider only the temporal dimension for overfitting. However, video may also have other dimensions, such as the depth or distance dimension, which represents the distance of captured points in the scene from the capturing device. The neural network may be overfitted to one or more portions of such video data, for example, a temporal portion of a video, a spatial portion of one or more video frames, or a depth map.

In particular, a neural network may be overfitted at different temporal-granularity levels; that is, the server may produce one neural network for each temporal portion, where the extent of the temporal portion may be one of, or a combination of, the following options:

A neural network may be fine-tuned to the entire video content, for example, a video file.
  In this case, the neural network needs to be sent only once and before video processing starts at a user device.
  The neural network may be signaled together with the target video, or it may be signaled as a separate data stream, by using a signaling pattern to inform the user device how to correctly associate the neural network with the target video content, considering that there may be different video content and different neural networks.

A different neural network may be overfitted on each different temporal portion of the video content, where a temporal portion may be more than one frame long but less than the whole video content. For example, the temporal content may be a few seconds or a few minutes long.
  In this case, each neural network needs to be sent by the server before the corresponding temporal portion of video content needs to be processed by the user device. For this, there are several options:
  Multiple or all of the neural networks are sent as at least one separate data stream before the whole video content is sent. Each neural network may have a content portion identifier (CPI), which enables the user device to associate it to the correct video content portion. The CPI may be, for example, an indication of a start time of the portion, an indication of both start and stop times, or a unique ID associated to a single content portion. The time unit may be expressed in terms of a number of frames from the beginning of the video, or in terms of actual time from the beginning of video, when the frame period or the frame rate is known. This implementation option is suitable in cases where the whole video content is available to the server before it is sent to the user device.
  Multiple or all the neural networks are sent as metadata with the first portion of video content. Each model has a content portion identifier CPI as defined above. This option is also suitable for the case where the whole video content is available to the server before it is sent to the user device.
  Each neural network is sent before the corresponding video content portion is sent, for example during the previous video content portion, either as metadata together with the previous video content portion (in which case, the CPI may not be needed because the user device may be configured to associate the received neural network instance with the next content portion), or as a separate data stream (in which case, the CPI may be used). In one example, the neural network applicable to a particular video content portion is indicated in a timed metadata track. The neural network may also be sent during one of the previous video content portions but not necessarily during the previous video content portion, together with a CPI.
  Each neural network is sent as metadata with the corresponding video content portion. In this case, the video content portion identifier might be present, or it might not be present when the association is unambiguous.
  In an additional embodiment, together with a certain video content portion, the server may send multiple neural networks overfitted on multiple future video content portions and associated via CPIs, when, for example, network conditions are predicted to get worse in the near future.

In an embodiment, the server may overfit one neural network for every single video frame, and signal the neural network in one of the ways described above for the different temporal portions.

In another embodiment, the server may overfit one neural network for every single spatial portion of a video frame, and signal the neural network in one of the ways described above for the different temporal portions.

In another embodiment, the server may overfit one neural network for every single spatio-temporal portion of a video, which may be represented as a three-dimensional object or a volume, and signal the neural network in one of the ways described above for the different temporal portions.

The server may send only neural-network updates, that is, only the changes to be applied to the weights, instead of the actual weights to be used, with respect to a previous state of the neural network. For example, for each temporal portion considered, the previous state of the neural network may be a base neural network, which is separately overfit for each temporal portion, or the neural network overfitted for one of the previous temporal portions, or a combination of these options, depending on which combination results in less transmission bandwidth or requires less of the capabilities of the user device.

For example, when the memory of the user device permits, the user device may store each overfitted neural network received thus far. For each temporal portion, the server would then transmit the current video content portion, the weight updates to be used for the current video content portion, plus an identifier of one of the previously sent neural networks which was overfitted on a previous temporal portion, on top of which the weight updates need to be applied.

In other words, the server may send signaling information to identify the base neural network on which the fine-tuned weights are intended to be applied. Examples are the following:

The base neural network may be the fine-tuned neural network of the previous video portion.

The base neural network may be the neural network fine-tuned on another previous video content portion, identified for example by the corresponding CPI.

The base neural network may be one that was sent initially, which has never been fine-tuned.

The base neural network may have been sent initially to both the server and the user device by a third-party entity.

The base neural network may have been trained by both the server and the user device independently but in a similar way so as to obtain either exactly the same neural network or a very similar one.

A base neural network may also be referred to as a reference neural network. The overfitting at the server may not modify all weights of the neural, network, but only a subset thereof. Thus, only this subset needs to be sent to the user device. This would greatly decrease the amount of information to be transmitted.

In this case, signaling may comprise weight-identifiers corresponding to the weights to be replaced, or to be modified, that is, updated, when the received information includes weight updates.

The present disclosure can also be used in omnidirectional streaming applications. In this case, instead of or in addition to overfitting neural networks for different temporal portions, different overfitted neural networks may be used for different spatial portions, for example, different regions of a packed 360°-video frame. It is also possible to use an overfitted neural network to enhance, for example to denoise, up-sample, or remove coding artifacts, one spatial portion only, while the other spatial portions are not post-processed by any neural network. This enables concentrating the neural network resources to the most important spatial portions of an omnidirectional video. A similar approach could also be applied in case of enhancing temporal portions of media content.

Cross-Datastream Adaptation

Information contained in the video content bitstream may be used for assisting the inference process of the fine-tuned neural networks. For example, switching between different overfitted neural networks may be determined and/or indicated based on characteristics of the encoding and/or the resulting bit stream. A few examples will be described below.

In particular, detecting shot boundaries may require a significant computational overhead, depending on the specific algorithm used. To avoid such overhead, the destination device may perform simple analysis of the bitstream, such as of specific components or patterns.

This would enable interoperability between the content bitstream and the neural network bitstream.

One embodiment of this idea is to check for intra-coded frames, that is, frames which are not predicted from temporally close frames. Intra-coded frames are usually placed in the bitstream when the scene changes considerably, such as when a sudden big prediction error occurs. Therefore, an intra-coded video frame may be used as a trigger for determining a neural network. For example, an overfitted neural network may be trained for a temporal portion starting from a particular intra-frame. A user device may determine to use a next neural network after each intra frame or a particular intra frame signaled by the server.

Another example is to use a shot boundary as a trigger for determining a neural network. Thus, detecting occurrence of a shot boundary may be used as an indication that the neural network received during the latest temporal content portion is to be used from this point onwards. As a consequence, there would be no need to have an explicit signaling which neural network is to be applied to which content portion.

Another embodiment of this idea is to check for trends of increasing prediction error. Such an increase could be used at the destination device as an indication to use the latest received neural network from that point onward. The signaling may be triggered, for example, when the prediction error is over a threshold. In one example, a server may be configured to monitor prediction error and determine to provide a new overfitted neural network based on the prediction error, for example in response to detecting that the prediction error has exceeded a threshold. The threshold may be predetermined or determined based on the content being processed. For example, the threshold may be set such that a new neural network is generated approximately or in average after a desired time interval. If new neural network versions are generated too often, the threshold may be increased, and vice versa.

In one example, the server may use one of the above video events, namely, intra-coded frames, shot boundary, and increased prediction error, as a trigger for training different overfitted neural networks. For example, the server may train a new overfitted neural network whenever a prediction error of the video stream exceeds a threshold. This position, such as a frame, may be signalled to the destination device along with the overfitted neural network.

In one alternative embodiment, for example when the end user device is not able to perform inference of the neural network for post-processing the incoming video content, there may be a third-party entity which has enough capabilities for neural network inference, and which has a sufficient communication bandwidth with at least the user device. The server may send the portion, for example a temporal portion, and the associated neural network to the third-party entity, which applies the neural network to the portion, and then sends the processed portion to the user device.

In summary, the present disclosure uses overfitted neural networks for different temporal and/or spatial portions of video content, and synchronizes the overfitting to events in the coded video stream.

More specifically, the sender device, or server, may overfit a neural network on each temporal portion of the video content and may send it to the receiver, or user device. The receiver may apply the neural network to the corresponding temporal portion. Each overfitted neural network may be associated with the same content portion that was used to train it. Using such network at the inference phase provides improved performance compared to neural networks trained by general datasets. The temporal portions may be defined based on patterns in the bitstream of the video content, such as by increase or decrease in bitrate. Detailed example procedures for selecting and signaling the content portions and related neural networks have been described above.

Turning now to the several figures which have been identified above, FIG. 1 shows a server suitable for the practice of the process described above. The generalized structure of the server will be explained in accordance with the functional blocks shown in FIG. 1. Several functionalities can be carried out with a single physical device. For example, all calculation procedures can be performed in a single processor, if desired. A data processing system 120 a server according to an example of FIG. 1 comprises a main processing unit 100, a memory 102, a storage device 104, an input device 106, an output device 108, and a graphics subsystem 110, which are all connected to each other via a data bus 112.

The main processing unit 100 is a conventional processing unit arranged to process data within the data processing system 120. The main processing unit 100 may comprise or be implemented as one or more processors or processor circuitry. The memory 102, the storage device 104, the input device 106, and the output device 108 may include conventional components as will be recognized by those skilled in the art. The memory 102 and storage device 104 store data in the data processing system 120. Computer program code resides in the memory 102 for implementing, for example, a computer-vision process or a media compression process. The input device 106 inputs data into the data processing system 120, while the output device 108 receives data from the data processing system 120 and forwards the data, for example, to a display or for transmission to a receiver. The data bus 112 is a conventional data bus and, while shown as a single line, it may be any combination of the following: a processor bus, a PCI (peripheral component interconnect) bus, a graphical bus, an ISA (industry standard architecture) bus. Accordingly, a skilled person readily recognizes that the server may be any data-processing device, such as a computer device, a personal computer, a server computer, a mobile phone, a smart phone or an Internet access device, for example, an Internet tablet computer.

The present embodiments relate to data compression, communication, and decompression, and to the field of machine learning and artificial intelligence.

Data compression, such as image and video compression, comprises reducing the amount of data used to represent certain information. The output of such an operation is a reduced set of data, which occupies less memory space or can be transmitted using less bitrate or bandwidth. For example, image compression consists of removing data from the original image, which can be easily predicted from the rest of the data by exploiting for example redundancies (smooth regions). An example of image compressor is JPEG (Joint Photographic Experts Group) standard. In the video domain, compression exploits also temporal redundancy, as objects and regions usually move at a low pace compared to the frame-sampling rate. An example of a video compressor is the H.264 standard. In general, compression can be either loss-less or lossy, meaning that the reconstruction of the original data from the compressed data may be perfect or non-perfect, respectively. Reconstruction of the original data, or an estimate of the original data, from the compressed data may be referred to as decompression.

Machine learning is a field which studies how to learn mappings from a certain input to a certain output, where the learning is performed based on data. In particular, a subfield of machine learning which has been particularly successful recently is deep learning. Deep learning studies how to use artificial neural networks for learning from raw data, without preliminary feature extraction.

Deep-learning techniques may be used for recognizing and detecting objects in images or videos with great accuracy, outperforming previous methods. The fundamental difference between a deep-learning image-recognition technique and previous methods is learning to recognize image objects directly from raw data, whereas previous techniques are based on recognizing the image objects from hand-engineered features, such as SIFT (scale-invariant feature transform) features. During the training stage, deep-learning techniques build hierarchical computation layers which extract features of increasingly abstract level.

Figure 2:
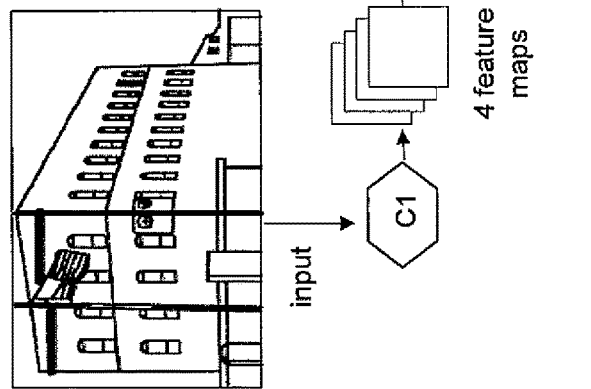
FIG. 2 shows an example of a Convolutional Neural Network.

An example of a feature extractor in deep-learning techniques is included in the Convolutional Neural Network (CNN), shown in FIG. 2. A CNN is composed of one or more convolutional layers, fully connected layers, and a classification layer on top CNNs are easier to train than other deep neural networks and have fewer parameters to be estimated. Therefore, CNNs are highly attractive architecture to use, especially in text, image, video and speech applications.

In FIG. 2, the input to a CNN is an image, but any other media content object, such as video file, could be used as well. Each layer of a CNN represents a certain abstraction (or semantic) level, and the CNN extracts multiple feature maps. A feature map may, for, example, comprise a dense matrix of Real numbers representing values of the extracted features. The CNN in FIG. 2 has only three feature (or abstraction, or semantic) layers C1, C2, C3 for the sake of simplicity, but CNNs may have more than three convolution layers.

The first convolution layer C1 of the CNN may be configured to extract four feature maps from the first layer (i.e. from the input image). These maps may represent low-level features found in the input image, such as edges and corners. The second convolution layer C2 of the CNN, which may be configured to extract six feature maps from the previous layer, increases the semantic level of extracted features. Similarly, the third convolution layer C3 may represent more abstract concepts found in images, such as combinations of edges and corners, shapes, and so forth. The last layer of the CNN, referred to as fully connected Multi-Layer Perceptron (MLP) may include one or more fully connected (that is, dense) layers and a final classification layer. The MLP uses the feature maps from the last convolution layer in order to predict (recognize), for example, the object class. For example, it may predict that the object in the image is a house.

An artificial neural network is a computation graph consisting of successive layers of computation, usually performing a highly non-linear mapping in a highly-dimensional manifold. Neural networks work in two phases: the development or training phase, and the test or utilization phase. During training, the network exploits training data for learning the mapping. Training can be done unsupervised, where there are no manually provided labels or targets, or supervised, where the network receives manually provided labels or targets. One of the most successful techniques for unsupervised learning is Generative Adversarial Networks (GAN), also referred to sometimes as Adversarial Training.

In GAN, a teacher is another neural network, called Discriminator, which indirectly teaches the first neural network (that is, the Generator) to generate data which looks realistic. One common use of GANs is in image generation, although GANs may also be used for other purposes, like style transfer, super-resolution, and inpainting. The Generator tries to generate images which look similar (but not the same) as those in the training dataset, with the goal of fooling the Discriminator (that is, convincing the Discriminator that the image is from the training set and not generated by the Generator). More precisely, the Generator tries to model the probability distribution of the data, so that generated images look like they were drawn (or sampled) from the true probability distribution of the data. The Discriminator sometimes receives images from the training set, and sometimes from the Generator, and has the goal of learning to correctly discriminate them. The loss is computed on the Discriminator's side, by checking its classification (or discrimination) accuracy. This loss is then used for training both the Discriminator and the Generator.

When compressing images or videos, the known solutions mostly focus on the low-level characteristics by using traditional signal-processing methodologies. For example, when compressing a face, the known algorithms need to compress and then store/transmit every part of the face, although, to an intelligent agent (for example, a person) it would be easy to imagine how one eye would look like when the other eye is already visible, or even how one eye would look like when only half of it is visible. If a compressor (and a decompressor) were able to perform such "imagining" operations, the whole pipeline would greatly benefit from it by obtaining big savings in bitrate. In fact, the "imaginable" or "determinable" parts of the image may be fully discarded from storage/transmission or kept with lower representation precision (such as, lower bitrate).

Recent advances in deep learning have shown that neural networks are able to extrapolate such semantic information, even to the most difficult point of generating or imagining the data itself. For example, neural networks were trained to imagine missing parts of an image, thus performing "inpainting" or "image completion". Thus, in the present embodiments, a deep learning system is presented to cope with the problem of leveraging semantic aspects of data, such as images and videos, in order to obtain a bitrate reduction. In particular, a novel pipeline is proposed for both training and utilizing neural networks for this goal.

In the present application, such network topology parameters are disclosed that can be streamed and sent to the client in parallel to the encoded bitstream so that the neural network can be adapted and/or changed on-the-fly during a streaming session.

The present embodiments are targeted to a neural network based framework for compression, streaming and de-compression of data such as images and videos.

In an example, an image is compressed. The image may be an image of a face. The basic idea of the present embodiments is to have a neural network that is able to decide which regions of the image should be encoded with higher quality and which other regions can be encoded with lower quality. The decision is based on how easy or difficult it is for a second neural network to imagine those regions. In particular, the regions which are encoded with low quality are those regions which are easily imaginable, such as specular regions (such as, right eye after having observed left eye and general pose of the face) and regions which do not change much among different examples of the same region type (such as a certain region of the face which does not change much among different persons).

As an additional embodiment, there may be different neural network versions for different contexts, such as sport, concert, indoor, outdoor, artificial (man-made) scene, natural (for example, forest) scene, etc. The system may decide to use one of these networks for encoding and decoding. The decision may be manual or automated. Automated decision may be implemented by using a context classifier at the encoder's side, and then the classified context is signaled to the decoder's side. In another embodiment, there may be different trained neural network instances and/or topologies based on the inpainting operation (face, building, natural content, synthetic content, etc.). The server may communicate with the client which neural network topology type is to be used for inpainting.

In another embodiment, the server may stream the network topology in-band or out-band of/from the video bitstream and have the new topology ready in the client before it is used for inpainting. Furthermore, instead of sending the whole topology and parameters at every update time, the system may send only the difference between the currently used topology and parameters and their updated or latest version, in order to further reduce the bitrate.

The embodiments can be used to reduce required data rate in any type of media transmission, for example, transmission of images, audio or video through local wired or wireless connections, and streaming, multicasting or broadcasting over wired or wireless networks, such as cellular networks or terrestrial, satellite or cable broadcast networks.

For the sake of clarity, in the present disclosure, a neural network can be implemented in different ways, also depending on the type of input data. As the present solution mainly concentrates on images, although the solution is easily extendible to video, audio, and other types of data, one common neural network is a Convolutional Neural Network (CNN), which consists of a set of layers of convolutional kernel matrices and non-linearity functions.

The encoding side may be considered as a system that receives an input image and produces an encoded image as an output. The encoding side may comprise various components, such as, a neural network and an image/video compression block. The decoding side may be considered as a system that receives an encoded image and outputs a decoded image, and may comprise various components, for example, a decoding algorithm (such as JPEG, JPEG2000, H.264, H.265, or the like) and a neural network. The encoded image may be transmitted by a transmitter to a receiver, where the decoder resides, or it may be stored locally as a file onto a memory. The encoded image is assumed to require fewer bits to be represented than the original image. The receiver may comprise an apparatus similar to apparatus 50, shown in FIG. 5, or the data processing system 120 for a server shown in FIG. 1. The receiver may be also considered to be at least one physical or logical sub-function of such apparatus or a system. For example, the term receiver may refer to decompressor circuitry or a memory storing a neural network, which may reside in apparatus 50 or the data processing system of FIG. 1.

Figure 3:
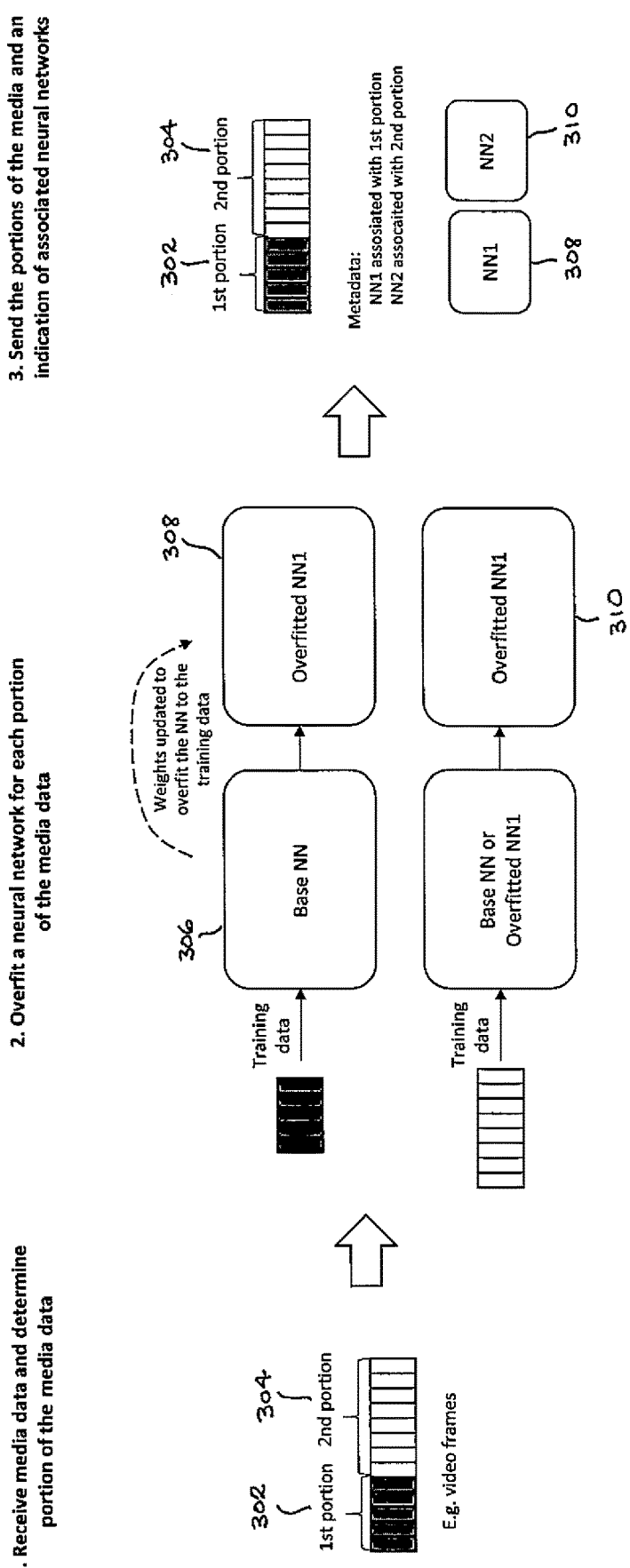
FIG. 3 is a schematic representation of a process carried out in an embodiment.

FIG. 3 is a schematic representation of a process carried out in an embodiment. The example of FIG. 3 is described by using video frames as example of content portions, but it is to be understood that embodiments disclosed herein are applicable to any other data portions. In the left-hand part of FIG. 3, media content is received at a server, for example, and broken down into portions, each of which includes at least one video frame. The first portion 302 is then used to train a base neural network 306, as shown in the central part of FIG. 3, and the weights in the base neural network 306 are updated to overfit the training data, in this case the first portion 302, to provide a first overfitted neural network (NN1) 308.

The second portion 304 is used to train either the base neural network 306 or the first overfitted neural network (NN1) 308. In either case, the weights are updated to overfit the training data, in this case the second portion, to provide a second overfitted neural network (NN2) 310.

In the right-hand part of FIG. 3, the portions of the media data are sent to a receiver, such as a user device or a user equipment, with an indication of the neural networks associated with each, for example, in the form of metadata indicating that the first overfitted neural network (NN1) 308 is associated with the first portion 302, and that the second overfitted neural network (NN2) 310 is associated with the second portion 304.

Figures 4A, 4B:
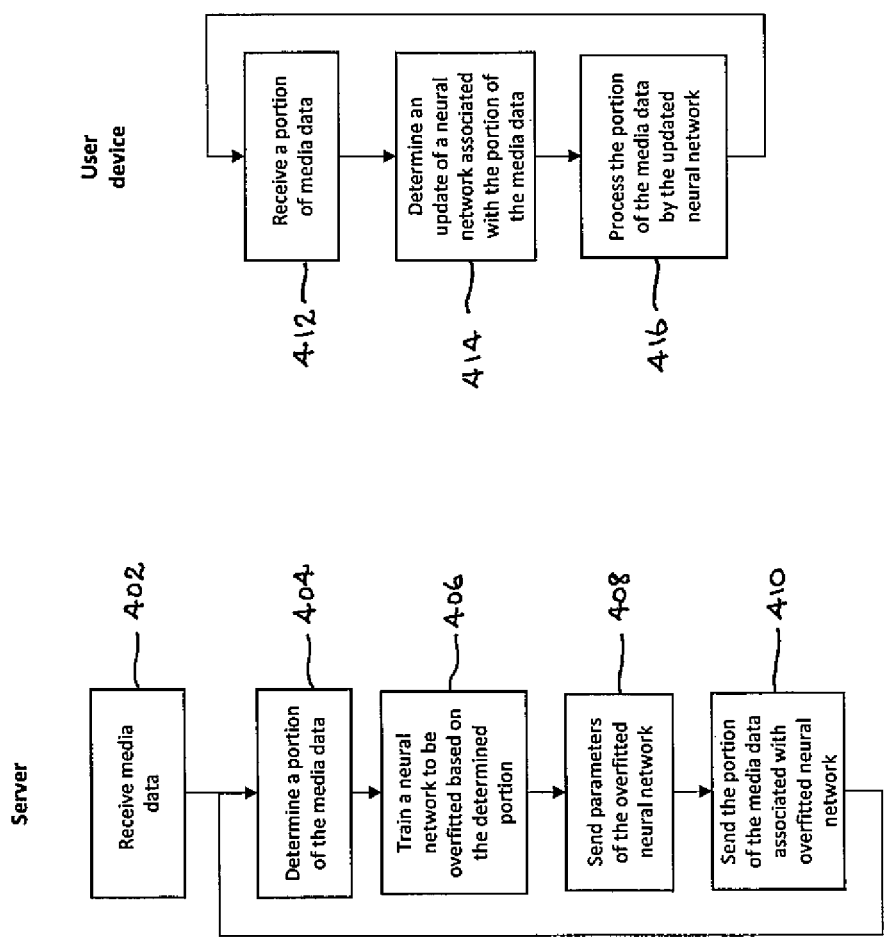
FIGS. 4A and 4B are schematic representations of a process carried out in an embodiment from the perspective of a server and a user device, respectively.

FIGS. 4A and 4B are schematic representations of a process carried out in an embodiment from the perspective of a server and a user device, respectively. Turning first to FIG. 4A, the server receives media data at block 402. The server then determines a portion of the media data at block 404, and trains a neural network to be overfitted based on the determined portion at block 406. The server sends the parameters (weights) of the overfitted neural network to the user device at block 408, and sends the portion of the media data associated with the overfitted neural network to the user device at block 410. The process returns to block 404 when there are one or more additional portions of media data requiring overfitting.

In FIG. 4B, the user device receives a portion of media data at block 412, and determines an update of a neural network associated with the portion of the media data at block 414. The user device then processes the portion of the media data using the updated neural network at block 416. The process returns to block 412 when one or more additional portions of media data are received.

According to an aspect of the invention, a method comprises: receiving media content for streaming to a user device; dividing the media content into a plurality of temporal portions; training a neural network to be overfitted to each of the plurality of temporal portions; and sending the plurality of trained neural networks and the plurality of temporal portions of the media content to the user equipment.

According to an embodiment, each of the plurality of trained neural networks may be sent to the user equipment before each corresponding one of the plurality of temporal portions of the media content.

According to an embodiment, the plurality of trained neural networks may be sent to the user equipment as a separate data stream before the plurality of temporal portions of the media content is sent.

According to an embodiment, the plurality of trained neural networks may be sent as metadata with a first one of the plurality of temporal portions of the media content.

According to an embodiment, each of the plurality of temporal portions may comprise a single frame of the media content.

According to an embodiment, the method further comprises sending metadata that associates the trained neural network with each of the plurality of temporal portions of the media content used to overfit the neural network.

According to an embodiment, the media content includes a video stream or an encoded image bitstream, and at least one of the temporal portions includes a spatial portion of a packed omnidirectional video frame.

According to an embodiment, the media content includes a video stream or an encoded image bitstream, and the plurality of temporal portions may be determined by detecting a prediction error of video coding to exceed a threshold.

According to an aspect of the invention, an apparatus comprises at least one processor; and at least one memory including computer program code, the at least one memory and the computer program code being configured, with the at least one processor, to cause the apparatus to perform the following: receive media content for streaming to a user device; divide the media content into a plurality of temporal portions; train a neural network to be overfitted to each of the plurality of temporal portions; and send the plurality of trained neural networks and the plurality of temporal portions of the media content to the user equipment. The computer program code may be further configured to cause the apparatus to perform one or more the embodiments of the methods as disclosed herein.

According to an aspect of the invention a program product comprises a non-transitory computer-readable storage medium bearing computer program code embodied therein for use with a computer, where the computer program code comprises code for performing: receiving media content for streaming to a user device; dividing the media content into a plurality of temporal portions; training a neural network to be overfitted to each of the plurality of temporal portions; and sending the plurality of trained neural networks and the plurality of temporal portions of the media content to the user equipment. The computer program code may further comprise code for performing one or more the embodiments of the methods as disclosed herein.

According to an aspect of the invention a method comprises: receiving a plurality of temporal portions of a media content and a corresponding plurality of neural networks trained to be overfitted to each of the plurality of temporal portions; and processing each of the plurality of temporal portions of the media content using each corresponding one of the plurality of the overfitted neural networks.

According to an embodiment, each of the plurality of trained neural networks may be received before each corresponding one of the plurality of temporal portions of the media content.

According to an embodiment, the plurality of trained neural networks may be received as a separate data stream before the plurality of temporal portions of the media content.

According to an embodiment, the plurality of trained neural networks may be received as metadata with a first one of the plurality of temporal portions of the media content.

According to an embodiment, each of the plurality of temporal portions may comprise a single frame of the media content.

According to an embodiment, the method further comprises: receiving metadata that associates the trained neural network with each of the plurality of temporal portions of the media content used to overfit the neural network.

According to an embodiment, the media content includes a video stream or an encoded image bitstream, and at least one of the temporal portions includes a spatial portion of a packed omnidirectional video frame.

According to an embodiment, the media content includes a video stream or an encoded image bitstream, and the plurality of temporal portions is determined by detecting a prediction error of video coding to exceed a threshold.

According to an aspect of the invention an apparatus comprises: at least one processor; and at least one memory including computer program code, the at least one memory and the computer program code being configured, with the at least one processor, to cause the apparatus to perform the following: receive a plurality of temporal portions of a media content and a corresponding plurality of neural networks trained to be overfitted to each of the plurality of temporal portions; and process each of the plurality of temporal portions of the media content using each corresponding one of the plurality of the overfitted neural networks. The computer program code may be further configured to cause the apparatus to perform one or more the embodiments of the methods as disclosed herein.

According to an aspect of the invention a computer program product comprises a non-transitory computer-readable storage medium bearing computer program code embodied therein for use with a computer, the computer program code comprising code for performing: receiving a plurality of temporal portions of a media content and a corresponding plurality of neural networks trained to be overfitted to each of the plurality of temporal portions; and processing each of the plurality of temporal portions of the media content using each corresponding one of the plurality of the overfitted neural networks. The computer program code may further comprise code for performing one or more the embodiments of the methods as disclosed herein.

Figure 5:
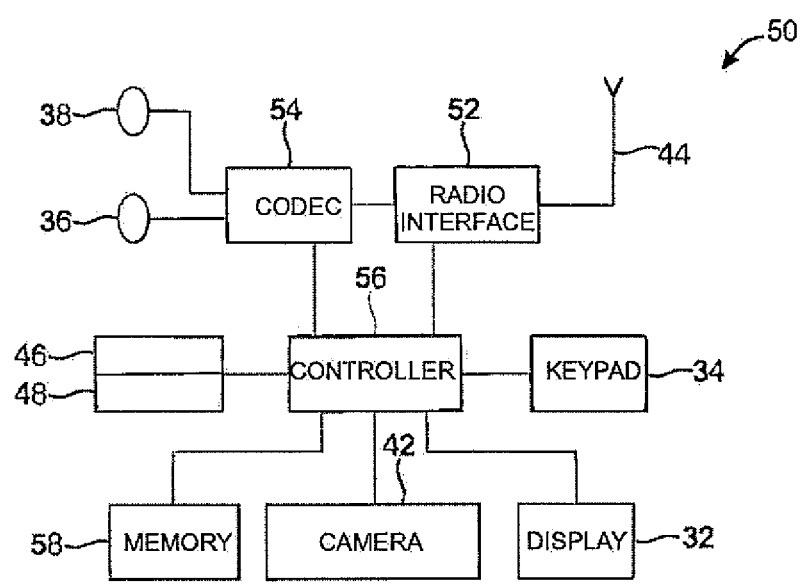
FIG. 5 shows an apparatus according to an embodiment in a simplified block chart.

An apparatus according to an embodiment is shown in FIG. 5 as a simplified block chart. The apparatus 50 may comprise a housing for incorporating and protecting the device. The apparatus 50 may further comprise a display 32 in the form of a liquid crystal display. In other embodiments of the invention, the display 32 may be any suitable display technology suitable to display an image or video. The apparatus 50 may further comprise a keypad 34. In other embodiments of the invention, any suitable data or user interface mechanism may be employed. For example, the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which, in embodiments of the invention, may be any one of an earpiece 38, speaker, or an analog audio or digital audio output connection. The apparatus 50 may also comprise a battery, or, in other embodiments of the invention, the apparatus 50 may be powered by any suitable mobile energy device, such as solar cell, fuel cell or clockwork generator. The apparatus may further comprise a camera system 42 capable of recording or capturing images and/or video. The camera system 42 may contain one or more cameras. The camera system 42 is capable of recording or detecting individual frames, which are then passed to the codec 54 or the controller 56 for processing. The apparatus 50 may receive the video and/or image data for processing from another device prior to transmission and/or storage. The apparatus 50 may further comprise an infrared port for short-range line-of-sight communication to other devices. According to an embodiment, the apparatus 50 may further comprise any suitable short-range communication solution, such as, for example, a Bluetooth wireless connection or a USB (Universal Serial Bus)/firewire wired connection.

The apparatus 50 may comprise a controller 56 or processor for controlling the apparatus 50. The controller 56 may be connected to memory 58, which may store data in the form of image, video and/or audio data, and/or may also store instructions for implementation on the controller 56. The controller 56 may further be connected to codec circuitry 54 suitable for carrying out coding and decoding of image, video and/or audio data or assisting in coding and decoding carried out by the controller 56. The apparatus 50 may be formed as a part of a server or cloud-computing system. The apparatus may be configured to receive video and audio data from a capture device, such as, for example, a mobile phone, through one or more wireless or wired connections. The apparatus 50 may be configured to analyze the received audio and video data and to generate a widened video field of view. The apparatus 50 may be configured to transmit the generated video and/or audio data to an immersive video display apparatus, such as, for example, a head-mounted display or a virtual reality application of a mobile phone.

The apparatus 50 may further comprise a card reader 48 and a smart card 46, for example, a UICC (Universal Integrated Circuit Card) and UICC reader, for providing user information and being suitable for providing authentication information for authentication and authorization of the user at a network. The apparatus 50 may comprise radio interface circuitry 52 connected to the controller 56 and suitable for generating wireless communication signals, for example, for communication with a cellular communications network, a wireless communications system, or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In general, the various exemplary embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although the invention is not limited thereto.

While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components, such as integrated circuit chips and modules, and that the exemplary embodiments of this invention may be realized in an apparatus that is embodied as an integrated circuit. The integrated circuit, or circuits, may comprise circuitry, as well as possibly firmware, for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. The exemplary embodiments of the invention presented herein are explanatory and not exhaustive or otherwise limiting of the scope of the invention.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various modifications and adaptations may become apparent to those skilled in the relevant arts in view of the foregoing description, when read in conjunction with the accompanying drawings. However, any and all modifications of the teachings of this disclosure will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the claims to follow.

What is claimed is:

1. An apparatus comprising: at least one processor; and at least one memory including computer program code, the at least one memory and the computer program code being configured, with the at least one processor, to cause the apparatus to perform the following:
receive media content for streaming to a user device;
train a neural network based on a first portion of the media content;
update weights of the neural network to overfit the neural network to the first portion of the media content to provide a first overfitted neural network;
train the neural network or the first overfitted neural network based on a second portion of the media content to form a trained neural network;
update weights of the trained neural network to overfit the trained neural network to the second portion of the media content to provide a second overfitted neural network;
send, to the user device, the first portion and the second portion of the media content with associations indicating the first overfitted neural network corresponds to the first portion and the second overfitted neural network corresponds to the second portion; and
send the first and the second overfitted neural networks or weight updates used for providing the first and second overfitted neural networks to the user device.

2. The apparatus as claimed in claim 1, wherein the neural network is initialized by using a random weight vector.

3. The apparatus as claimed in claim 1, wherein the neural network is initialized by pre-training the neural network on a large dataset and then trained based on data of the first portion of the media content to move the neural network from a generalized state to an overfitted state.

4. The apparatus as claimed in claim 1, wherein the computer program code is further configured, with the at least one processor, to cause the apparatus to perform the following:
send metadata that associates the first and second overfitted neural networks with the first and the second portions of the media content.

5. The apparatus as claimed in claim 4, wherein the media content includes a video stream or an encoded image bitstream, and wherein the first portion includes a spatial portion of a packed omnidirectional video frame.

6. The apparatus as claimed in claim 4, wherein at least one of the first portion and the second portion of the media content includes at least one of a temporal portion and a spatial portion of the media content.

7. The apparatus as claimed in claim 6, wherein the media content includes a video stream or an encoded image bitstream, and wherein the temporal portion is determined by detecting a prediction error of video coding to exceed a threshold.

8. A method comprising:
receiving media content for streaming to a user device;
training a neural network based on a first portion of the media content;
updating weights of the neural network to overfit the neural network to the first portion of the media content to provide a first overfitted neural network;
training the neural network or the first overfitted neural network based on a second portion of the media content to form a trained neural network;
updating weights of the trained neural network to overfit the trained neural network to the second portion of the media content to provide a second overfitted neural network;
sending, to the user device, the first portion and the second portion of the media content with associations indicating the first overfitted neural network corresponds to the first portion and the second overfitted neural network corresponds to the second portion; and
sending the first and the second overfitted neural networks or weight updates used for providing the first and second overfitted neural networks to the user device.

9. A computer program product comprising a non-transitory computer-readable storage medium bearing computer program code embodied therein for use with a computer, the computer program code comprising code for performing:
receiving media content for streaming to a user device;
training a neural network based on a first portion of the media content;
updating weights of the neural network to overfit the neural network to the first portion of the media content to provide a first overfitted neural network;
training the neural network or the first overfitted neural network based on a second portion of the media content to form a trained neural network;
updating weights of the trained neural network to overfit the trained neural network to the second portion of the media content to provide a second overfitted neural network;

sending, to the user device, the first portion and the second portion of the media content with associations indicating the first overfitted neural network corresponds to the first portion and the second overfitted neural network corresponds to the second portion; and sending the first and the second overfitted neural networks or weight updates used for providing the first and second overfitted neural networks to the user device.

10. An apparatus comprising:
  at least one processor; and
  at least one memory including computer program code, the at least one memory and the computer program code being configured, with the at least one processor, to cause the apparatus to perform the following:
    receive a first portion of media content and a second portion of media content;
    receive first and second overfitted neural networks or weight updates for them;
    determine, using at least the received first and second portions of media content, associations between the first portion and the first overfitted neural network and between the second portion and the second overfitted neural network; and
    process said first portion of the media content and said second portion of the media content using said first overfitted neural network and said second overfitted network or weight updates for providing the first and second overfitted neural networks.

11. The apparatus as claimed in claim 10, wherein the computer program code is further configured, with the at least one processor, to cause the apparatus to perform the following:
    receive metadata that associates the first and second portions of media content to the first and second overfitted neural networks.

12. The apparatus as claimed in claim 11, wherein the media content includes a video stream or an encoded image bitstream, and wherein the first portion includes a spatial portion of a packed omnidirectional video frame.

13. The apparatus as claimed in claim 10, wherein at least one of the first portion and the second portion of the media content includes at least one of a temporal portion and a spatial portion of the media content.

14. The apparatus as claimed in claim 13, wherein the media content includes a video stream or an encoded image bitstream, and wherein the temporal portion is determined by detecting a prediction error of video coding to exceed a threshold.

15. A method comprising:
    receiving a first portion of media content and a second portion of media content;
    receiving first and second overfitted neural networks or weight updates for them;
    determining, using at least the received first and second portions of media content, associations between the first portion and the first overfitted neural network and between the second portion and the second overfitted neural network; and
    processing said first portion of the media content and said second portion of the media content using said first overfitted neural network and said second overfitted network or weight updates for providing the first and second overfitted neural networks.

16. A computer program product comprising a non-transitory computer-readable storage medium bearing computer program code embodied therein for use with a computer, the computer program code comprising code for performing:
    receiving a first portion of media content and a second portion of media content;
    receiving first and second overfitted neural networks or weight updates for them;
    determining, using at least the received first and second portions of media content, associations between the first portion and the first overfitted neural network and between the second portion and the second overfitted neural network; and
    processing said first portion of the media content and said second portion of the media content using said first overfitted neural network and said second overfitted network or weight updates for providing the first and second overfitted neural networks.

17. The apparatus as claimed in claim 1, wherein the first and second portions of the media content comprise at least some different information from the media content.

18. The apparatus as claimed in claim 1, wherein the sending the first and the second overfitted neural networks or weight updates used for providing the first and second overfitted neural networks to the user device sends only the first and the second overfitted neural networks.

19. The apparatus as claimed in claim 1, wherein the sending the first and the second overfitted neural networks or weight updates used for providing the first and second overfitted neural networks to the user device sends only the weight updates used for providing the first and second overfitted neural networks.

* * * * *